May 1, 1962 K. MÜLLER 3,031,765
ROLLING GEAR TESTER
Filed March 24, 1959 3 Sheets-Sheet 1

Inventor
Karl Müller
By
Wenderoth, Lind & Ponack
Attorneys

May 1, 1962 K. MÜLLER 3,031,765
ROLLING GEAR TESTER
Filed March 24, 1959

Inventor
Karl Müller
By Wenderoth, Lind & Ponack
Attorneys

May 1, 1962  K. MÜLLER  3,031,765
ROLLING GEAR TESTER
Filed March 24, 1959  3 Sheets-Sheet 3

Inventor
Karl Müller
By
Wenderoth, Lind & Ponack
Attorneys

United States Patent Office 3,031,765
Patented May 1, 1962

3,031,765
ROLLING GEAR TESTER
Karl Müller, Zurich, Switzerland, assignor to Maag Gear-Wheel & Machine Company Limited, Zurich, Switzerland
Filed Mar. 24, 1959, Ser. No. 801,487
Claims priority, application Switzerland Apr. 23, 1958
12 Claims. (Cl. 33—179.5)

The present invention relates to a rolling gear tester for the testing of intermeshing gears such as two gears or one gear intermeshing with a master gear. For example, first the forward driving flanks of the gear teeth are tested, and subsequently the rearward driving flanks, the rolling errors being measured as a deviation from the uniform transmission of the angular velocity from one of the intermeshing gears to the other.

Gear testers of this kind have, for a certain gearing to be tested, base circle discs dimensioned accordingly which transmit the design movement of the two intermeshing gears to the two mounting spindles on which these gears are mounted, the actual movement deviating from the said design movement being measured. Accordingly for any gearing to be tested very accurate corresponding base circle discs had to be made which involved a very substantial expense.

Gear testers for measuring the tooth profiles of individual gears also use a sine ruler for the purpose of making the gear tester independent of a plurality of base circle discs and for cooperating with a single base circle disc. With such gear testers, however, no rolling test of a pair of intermeshing gears can be carried out, but only the testing of the tooth flanks of an individual gear.

It is a primary object of the present invention to provide a rolling gear tester which allows simultaneous testing of a pair of intermeshing gears to be carried out with the use of base discs of a constant diameter independent of the dimensions of the gears tested.

It is another object of the present invention to provide a rolling gear tester which is suitable both for the testing of two intermeshing externally toothed gears and for the testing of an internally toothed gear intermeshing with an externally toothed gear, and which can be switched over readily from the testing of two externally toothed gears to the testing of an internally toothed gear in mesh with an externally toothed gear.

It is still another object of the present invention to provide a rolling gear tester which is suitable both for the testing of bevel gearing and of hypoid gearing, and which can be readily adapted from the testing of bevel gearing to the testing of hypoid gearing.

With these and other objects in view which will be apparent from the following specification and accompanying drawings, I provide a rolling gear tester for testing a pair of intermeshing gears, comprising in combination: a bed, a first mounting spindle for one of the gears to be tested journalled on said bed, a work-piece carrier movably mounted on said bed, a second mounting spindle for the other one of the gears to be tested journalled on said workpiece carrier, means for adjusting and securing the position of the workpiece carrier on said bed, a base disc of constant diameter independent of the dimensions of the gear to be tested mounted on each of said mounting spindles, a measuring slide slidably mounted on said bed, means for adjusting and arresting said measuring slide on said bed, a first ruler slidably mounted in said measuring slide in slip-free rolling contact with said base disc on said first mounting spindle, a second ruler mounted on said bed slidable parallel to said measuring slide and in slip-free rolling contact with the base disc on said second mounting spindle, a control ruler mounted angularly adjustable and fixable on said measuring slide and having a longitudinal groove, and a slider block pivotally mounted on said first ruler and slidably engaging said longitudinal groove, the angle of adjustment of said control ruler being a function of the ratio of teeth of the two gears to be tested and of the inverse ratio of the diameters of said two base discs.

Preferably said base discs and their associated rulers are kept in slip-free mutual rolling contact by magnetic means providing magnetic attraction. Preferably also said first and second ruler are mounted for movements perpendicular to one another.

In one embodiment of the rolling gear tester according to the present invention, which is suitable for the testing of a pair of externally toothed gears or of an internally toothed gear in mesh with an externally toothed gear the workpiece carrier is slidable on the bed in a direction parallel to that of the measuring slide. The control ruler is adjustable to a positive angle relative to the direction of movement of the measuring slide for the testing a pair of externally toothed gears, and to a negative angle for the testing of an internally toothed gear meshing with an externally toothed gear.

A recording instrument mounted on the measuring slide includes a recording drum, journalled on the measuring slide and in driving connection with the bed so as to be rotated in synchronism with the movement of the measuring slide relative to the bed, and a recording stylus pivoted on the measuring slide in scribing relation to the recording drum and articulated to the second ruler, the said stylus recording on said drum any longitudinal movements of the second ruler relative to the measuring slide.

Resilient means coupling the second ruler longitudinally to the measuring slide are provided, and adjustable means shiftable and fixable on the measuring slide are provided for reversing the resilient bias of the resilient coupling means for changing the testing of one set of flanks of the intermeshing gears to be tested to the other set of flanks thereof.

Another embodiment of the rolling gear tester is suitable for the testing of intermeshing bevel gears or hypoid gears and includes a first mounting spindle for one of the gears to be tested journalled on the bed, a work piece carrier pivotally mounted on the bed about an axis intersecting the axis of the first mounting spindle, a second mounting spindle for the other one of the gears to be tested journalled on the work piece carrier about an axis intersecting the axis of the latter, a base disc mounted on the first mounting spindle, a measuring slide slidably mounted on the bed, a first ruler mounted on the measuring slide parallel to the movement of the measuring slide and in slip-free rolling contact with the first base disc, a second base disc rotatably mounted on the work piece carrier co-axially thereto, a second ruler mounted slidably on the bed in slip-free rolling contact with the second base disc, a control ruler mounted angularly adjustable and fixable on the measuring slide, a slider block pivotally mounted on the second ruler and slidably engaging a longitudinal groove of the control ruler, the angle of adjustment of the control ruler being a function of the ratio of teeth of the two intermeshing gears to be tested, of the inverse ratio of the diameters of the two base discs, and of the cone angle of the gears to be tested, and a bevel gearing of constant transmission ratio provided having one bevel gear connected for rotation with the second base disc and another bevel gear connected for rotation with the second mounting spindle and transmitting rotational movement from the second base disc to the mounting spindle.

The bevel gear transmitting rotational movement from the second base disc to the second mounting spindle is preferably a friction gearing.

For the testing of hypoid gearing, adjustment means are provided for the off-set between the axes of the intermeshing hypoid gears to be tested, said adjustment means adjusting the work piece carrier with the second mounting spindle journalled on the same and the bevel gearing of constant transmission ratio, in the direction of the pivot axis of the work piece.

In the accompanying drawings given by way of example:

Figure 1:
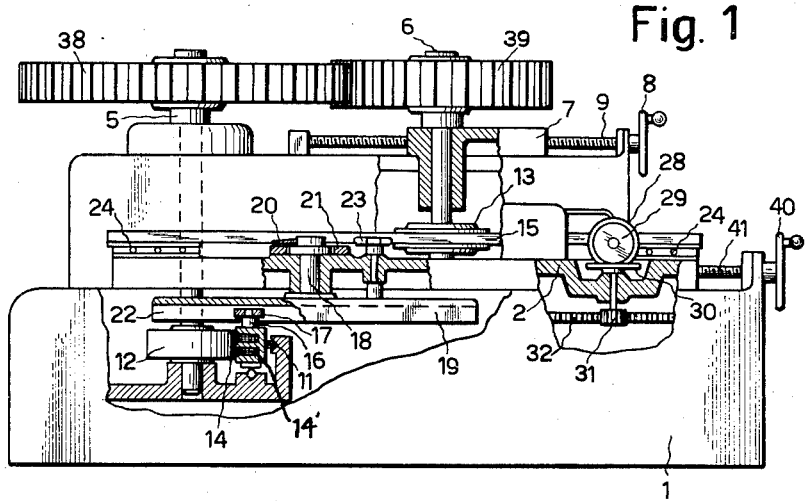
FIGURE 1 is a side elevation of a gear tester on which an externally toothed gearing having parallel axes is being tested, with some parts shown for better understanding in section on the line I—I of FIGURE 2.

The gear tester shown in FIGURES 1 to 4 inclusive will first be described.

On the bed 1 of the rolling gear tester the measuring slide 2 is slidably mounted by means of guides 3 and 4. The mounting spindle 5 for one gear 38 of the gearing to be tested is journaled vertically in the bed 1, while the mounting spindle 6 for the second gear 39 is vertically journaled in the work piece carrier 7. This work piece carrier 7 is slidable in the bed 1 parallel to the measuring slide 2 by means of a hand wheel 8 and threaded shaft 9, in order to adjust the distance between the axes. This distance between the axes can be read off a scale 10. On the mounting spindle 5 a base disc 12 is fixed. It has a constant diameter, independent of the gear to be tested. The same applies to the base disc 13 on the mounting spindle 6. Each of the two base discs 12 and 13 is in slip-free rolling contact with a ruler 14 and 15, respectively. This freedom from slip is attained by electro-magnetic pressure. The first ruler 14 associated with the base disc 12 is guided in the bed 1 on rollers 11, perpendicular to the direction of movement of the measuring slide 2. The second ruler 15 associated with the base disc 13 is guided in the measuring slide 2 on rollers 24, parallel to the direction of movement of the measuring slide 2.

On the first ruler 14 a pin 16 is mounted on which a slider block 17 is rotatably mounted. In this way the first ruler 14 is connected to the block 17, which is guided on an angularly adjustable control ruler 19 which is pivotally mounted on the measuring slide 2 on a vertical shaft 18. The rotational adjustment of the control ruler 19 is transmitted by the shaft 18 also to a pointer 20, so that the angular position of the control ruler can be read off an associated scale 21, which is fixed to the measuring slide 2. The control ruler 19 has a straight longitudinal groove 22, in which the slider block 17 slidably engages. By means of a hand grip 23 the control ruler can be fixed to the measuring slide 2, so that the angular position to which it is adjusted remains preserved even when the control ruler is loaded.

The second ruler 15 has a recess 25 into which engages a feeler 26 of a recording stylus 27, the said recording stylus being mounted on the measuring slide 2. The recording stylus 27 records the values ascertained by the feeler 26 on a recording strip of a drum 28, which is operatively connected to a gear 31 through friction discs 29 and 30. This gear 31 meshes with a toothed rack 32 fixed to the bed 1, so that upon movement of the measuring slide 2 the recording drum 28 rotates. The second ruler 15 is moreover provided with a nose 33. This nose 33 is in operative connection through springs 34 and 35 with an adjustable bar 36, which may be held in fixed position by a hand grip 37. The measuring slide 2 is shifted on the bed 1 by means of a hand wheel 40 and a threaded spindle 41.

The rolling gear tester according to FIGS. 1, 2 and 3 operates as follows. After fitting the gears 38 and 39 to be tested on the mounting spindles 5 and 6, respectively, the distance between the axes of the gearing to be tested is transferred by the hand wheel 8 and the spindle 9 to the work piece carrier 7, and is read off on the scale 10. The gearing thus adjusted has a certain play at the flanks. Then the control ruler is adjusted in accordance with the scale 21 and fixed by the hand grip 23. This adjustment is effected according to the following formula:

$$\tan \alpha = \frac{D_2}{D_1} \cdot \frac{z_1}{z_2} \qquad (1)$$

wherein:

$\alpha$ is the adjustment angle of the control ruler 19 on the scale 21,
$D_1$ is the diameter of the base disc 13,
$D_2$ is the diameter of the base disc 12,
$z_1$ is the number of teeth of the gear 39,
$z_2$ is the number of teeth of the gear 38.

Thereafter, for the purpose of testing one flank of the gearing, e.g. of the flank driving forward, the bar 36 with the springs 34 and 35 is shifted to one side and is fixed by the hand grip 37, so that owing to the bias of these springs 34 and 35 the forward flanks of the gear 39 contact those of the gear 38 through the cooperation of the second ruler 15 and base disc 13.

For testing the rear flanks of the gearing the bar 36 is shifted to the opposite side, whereby the direction of force of the measuring thrust on the tooth flanks is reversed.

In order to record summation errors, i.e. those errors which cause a deviation from the uniform transmission of motion by the gearing to be tested, the measuring slide 2 is moved on the bed 1, by the hand wheel 40 and the spindle 41. By this longitudinal movement of the measuring slide 2 the slide block 17 is shifted in the longitudinal groove 22 of the control ruler 19 which stands at an angle $\alpha$, whereby a movement perpendicular to the measuring slide 2 is imparted to the first ruler 14. The transmission ratio of these two movements is calculated in accordance with the Formula 1 above.

By the movement of the first ruler 14 the base disc 12 is turned. A slip-free transmission is assured with a magnet by the excitation of the coils 14' of the first ruler 14 over the wires 42.

From the base disc 12 the rotational movement is transmitted through the mounting spindle 5 to the gear 38, which passes the movement on to the gear 39 through the flanks to be tested. The gear 39 turns through the mounting spindle 6 the base disc 13, the coil 13' of which is likewise energized over the wires 42, and the base disc 13 in turn carries along the second ruler 15 free of slip.

With a theoretically correct toothing this second ruler 15 performs exactly the same movement as the feeler 26 mounted on the recording instrument 27 and accordingly mounted on the measuring slide 2, which feeler engages into the recess 26 of the second ruler 15. The recording stylus would in this case record a straight line on the recording drum 28, which runs synchronously with the measuring slide 2. When, however, owing to faults of the flanks, to faults in running true or to other faults the transmission of movement from the gear 38 to the gear 39 does not take place uniformly, the second ruler 15 precedes the feeler 26 or lags behind the same. Therefrom amplitudes result of the recording stylus 27, the magnitudes of which can be read off from the resulting graph on the recording drum 28. Owing to the limited length of the control ruler 19 it is not possible to extend the testing over any desired number of revolutions. Inherently, however, a single revolution of the larger gear 38 of the two gears to be tested suffices.

Figure 3:
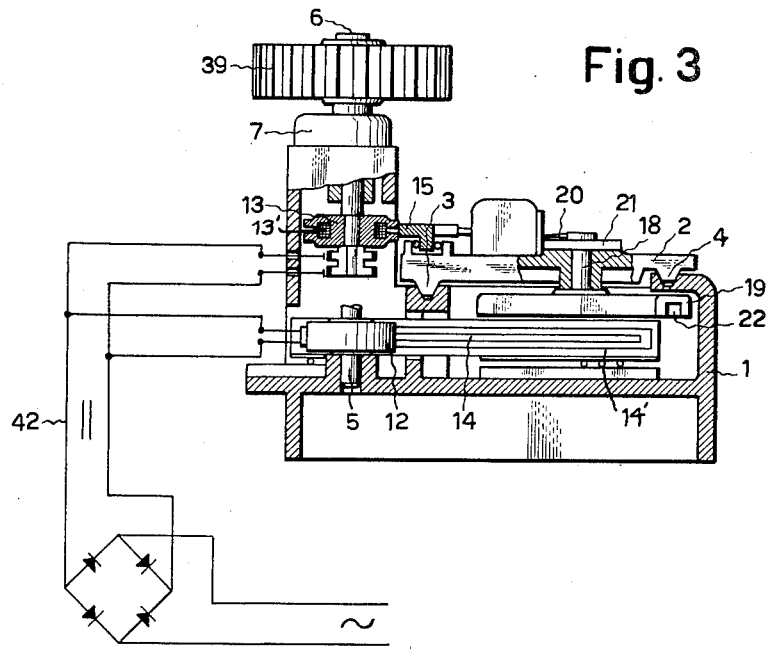
FIGURE 3 shows the same gear tester in cross section on the line III—III of FIGURE 2, and also shows diagrammatically the electric circuit diagram of the electromagnets thereof.
Figure 4:
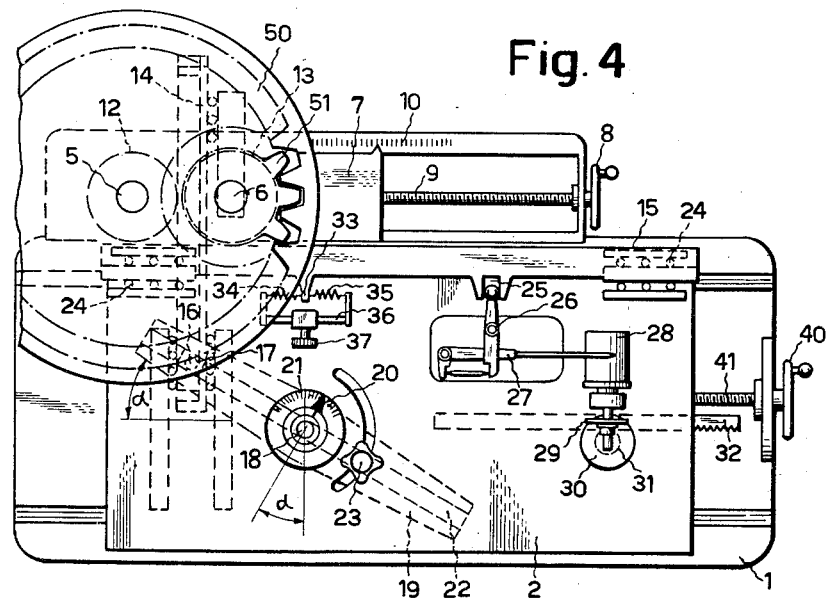
FIGURE 4 illustrates in plan view the adjustment of the same gear tester for a gearing having parallel axes, one gear being toothed internally.

A further application of the same rolling gear tester is illustrated in FIGURE 4, where an internally toothed gear 50 is fitted to the mounting spindle 5, and an externally toothed spur gear 51 in mesh therewith is fitted to the mounting spindle 6. The only difference as compared with the adjustment for two externally toothed gears, as described with reference to FIGURES 1, 2 and 3, consists in that the control ruler 19 is turned an angle $\alpha$ in the opposite sense, i.e. from the positive to the negative side. Thereby the first ruler 14 has likewise the opposite direction of movement imparted to it as compared with that obtaining with a pair of externally toothed gears to be tested as described with reference to FIGURES 1, 2 and 3, the same direction of movement of the measuring slide 2 being assumed.

Figure 5:
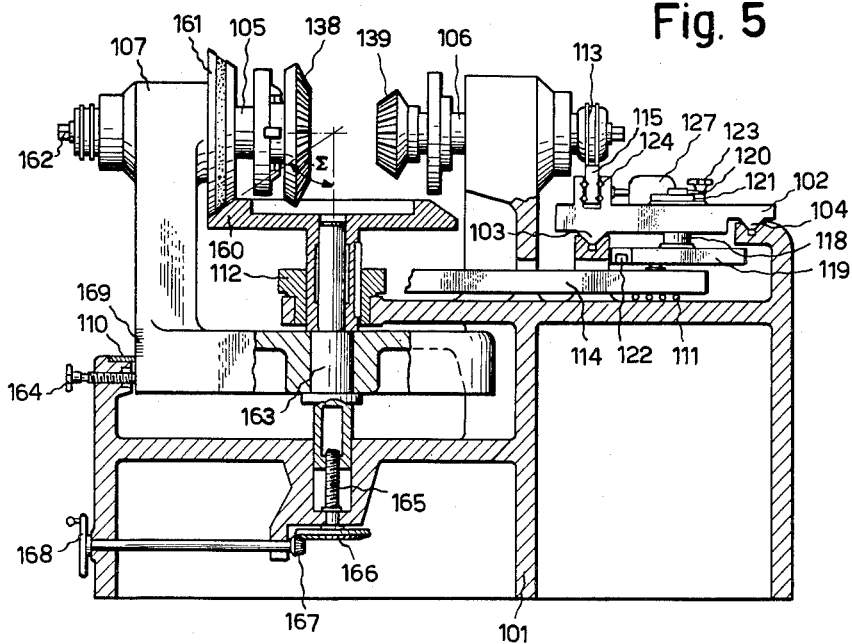
FIGURE 5 is a longitudinal section of an instrument for the testing of bevel gearings, some parts being shown in section on the line V—V of FIGURE 6 for clarity.
Figure 6:
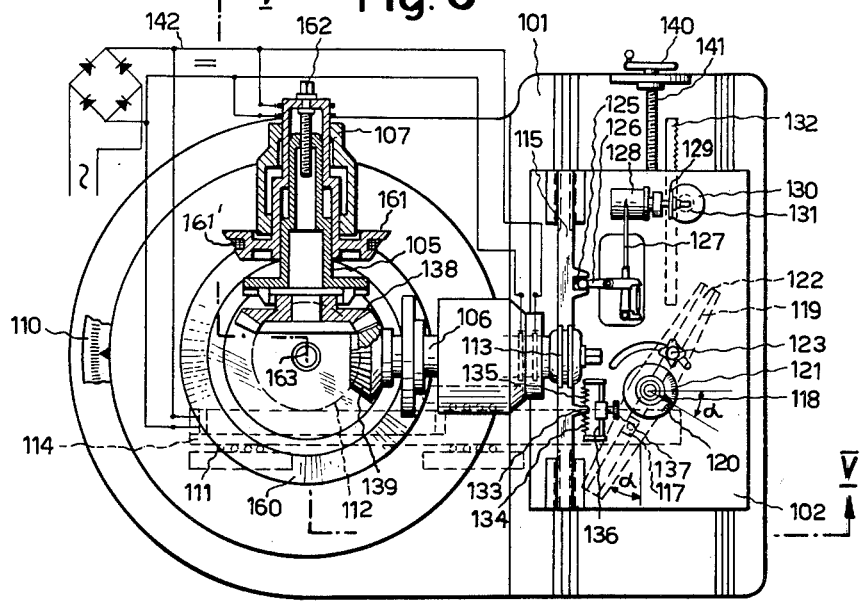
FIGURE 6 shows the same instrument in plan view, one mounting spindle being illustrated in horizontal section.

Another modification of the same principle of the invention is embodied in the rolling gear tester for bevel gearing and hypoid gearing according to FIGURES 5 and 6. For better understanding and simplicity, the lowest digits of the reference numbers for analogous components have been chosen the same as the reference numbers of the gear tester according to the FIGURES 1, 2 and 3. On the bed 101 of the gear tester the measuring slide 102 is mounted slidably by means of the guides 103 and 104 and is movable by the hand wheel 140 and threaded spindle 141. Parallel thereto the second ruler 115 is mounted shiftably on the measuring slide 102, where it is guided by balls 124. The second ruler 115 contains a recess 125, into which engages the feeler 126 of the recording stylus 127 that is mounted on the measuring slide 102. The recording drum 128, which receives the recordings made by the recording stylus 127, is driven by the friction discs 129 and 130. Mounted on the same shaft with it, and connected to the friction disc 130 is also a gear pinion 131. The latter is in mesh with a toothed rack 132 fixed to the bed, so that, upon moving the measuring slide 102, the recording drum 128 is turned synchronously therewith. On the second ruler 115 there is a nose 133 on which act two springs 134 and 135. These are in turn connected to the bar 136. The bar 136 is shiftable, and can be fixed, by means of the hand grip 137 mounted on the measuring slide 102. The base disc 113 having an exciter coil similar to the exciter coil 13' of FIGURES 1, 2 and 3 is in slip-free rolling contact with the second ruler 115. This base disc has a diameter independent of the transmission ratio of the gearing 138 and 139 to be tested. To the exciter coils provided therein for producing the electro-magnetic attraction, current is supplied by the wires 142. The base disc 113 is fixedly connected to the mounting spindle 106, which is journalled horizontally in the bed 101 and carries the gear 139 to be tested.

The measuring slide 102 has a shaft 118 journalled vertically therein with the pointer 120 and the control ruler 119 fixedly connected therewith. The pointer 120 indicates the angular position of the control ruler on the scale 121 which is provided on the measuring slide 102. The control ruler is adjusted angularly by means of the hand grip 123 and is then fixed on the measuring slide 102. The control ruler 119 has a longitudinal groove 122, wherein slides the slider block 117. The slider block 117 is pivotally mounted on the pin 116 which is fixed to the first ruler 114. The first ruler 114 is mounted on the bed 101 by means of balls 111, and is slidable perpendicular to the direction of movement of the measuring slide 102 and accordingly also of the second ruler 115. In the first ruler 114 coils similar to 14' in FIGURES 1, 2 and 3 are provided which generate the electromagnetic attraction force between the first ruler 114 and the base disc 112, and thereby secure slip-free force-closed rolling contact between these two components.

The supply of current to these exciter coils in ruler 114 is effected through the supply line 142. The base disc 112 has a constant diameter which is independent of the transmission ratio of the gears 138 and 139 to be tested. The base disc 112 is journalled vertically in the bed 101 with the hub of a conical transmission disc 160 slidably mounted therein but restrained from rotation relative thereto. A corresponding conical transmission disc 161 is in a slip-free force closed rolling contact with the transmission disc 160 thereby forming a friction gearing with it. The friction disc 161 is provided with coils 161' for the electro-magnetic attraction to the disc 160, which coils are connected to the current mains by the wires 142.

The cone angle of the transmission- or friction-discs 160 and 161, i.e. of the bevel gearing, is independent of the transmission ratio of the gearing to be tested, and is constant. The disc 161 is journalled horizontally in a pivotal work piece carrier 107 and receives the mounting spindle 105 which is axially slidable therein and carries in turn the bevel gear 138 to be tested. The threaded spindle 162 adjusts and fixes the mounting spindle 105 in the disc 161. The work piece carrier 107 is rotatable about a vertical axis, the angular position (corresponding to the angle included by the axes of the bevel gearing or hypoid bearing to be tested) of which can be read off the scale 110, and fixed by a hand grip 164 carried by a threaded stop bolt.

For the testing of hypoid gears the work piece carrier 107 is adjusted in height, together with the components journalled therein and with the disc 160, by means of a threaded spindle 165 arranged within the axle 163, which is screw-tapped and is mounted axially shiftable in the bed 101, in order to offset the axes of the mounting spindles 105 and 106 with respect to one another. The threaded spindle 165 is axially journalled in the bed 101 and is driven by the bevel gearing 166 and 176 and the hand wheel 168. The adjustment in height, i.e. the magnitude of the offset of these axes can be read off by means of the scale 169.

Figure 2:
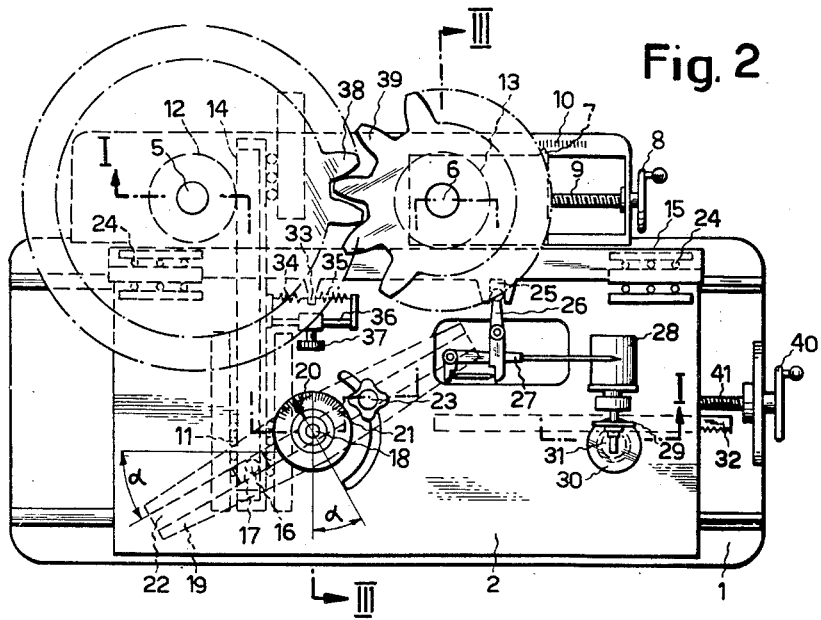
FIGURE 2 is a plan view of the same gear tester.

The functioning of the gear tester according to FIGURES 5 and 6 is similar to that of the gear tester according to FIGURES 1, 2 and 3. After the gears to be tested have been fitted and the work piece carrier 107 adjusted to the angle between the axes, the adjustment of the mounting spindles 105 and 106 for the center distance, and with hypoid gearings also the adjustment of the work piece carrier 107 by means of the handwheel 168 to the offset of the axes has been carried out, the spring bias of the springs 134 and 135 is applied by the handgrip 137 to one or the other of the tooth flanks. The adjustment of the control ruler 119 is effected in accordance with the formula:

$$\tan \alpha = \frac{D_2}{D_1} \cdot \frac{z_1}{z_2} \cdot \cot \Sigma \qquad (2)$$

wherein:

α is the adjustment angle of the control ruler 119 on the scale 121
$D_1$ is the diameter of the base disc 113
$D_2$ is the diameter of the base disc 112
$z_1$ is the number of teeth of the gear 139
$z_2$ is the number of teeth of the gear 138
$\Sigma$ is the cone angle of the friction disc 160

By shifting the measuring slide 102 by means of the handwheel 140, the feeler 126 of the recording stylus 127, on the one hand, is moved at a certain rate. On the other hand, with a theoretically correct toothing of the gearing tested, the ruler 115 is moved at the same rate by means of the slider block 117, the ruler 114, the base disc 112, the friction discs 160 and 161, the gears 138 and 139 to be tested, and the base disc 113. Any deviation of the toothing from the design shape makes itself noted by a different rate of movement of the ruler 115 as compared with that of the feeler 126 to which the recording stylus 127 responds, recording the error on the drum 128, which moves synchronously with the measuring slide 102.

It is not necessary for the base discs to have the same diameter and it is even often advantageous, if the same are made with different diameters in order to attain better sliding conditions between the slider block and the control ruler. Decisive therefore are the ranges of the transmission ratios mostly used of the gearings to be tested. The same applies to the conical friction gearing 129, 130.

In the two embodiments described of the rolling gear tester, electromagnetic forces are used for the slip-free transmission of the forces between the rulers and the associated base discs. Instead of the magnetic attraction, however, conventional steel bands may also be used for attaining a slip-free transmission.

In the embodiments described the measuring slides 2 and 102 are shifted by means of a hand wheel 40 and 140, respectively. Instead of this hand-operated adjustment it is advantageous in certain cases to use a power-operated adjustment of the measuring slide 2, for example hydraulically, or driven by an electric motor, which is of advantage with automatically controlled gear testers.

While I have described herein and illustrated in the accompanying drawings what may be described as a typical and particularly useful embodiment of my said invention, I wish it to be understood that I do not limit myself to the particular details and dimensions described and illustrated for obvious modifications will occur to a person skilled in the art.

I claim:

1. A rolling gear tester for testing a pair of intermeshing gears, comprising in combination a bed, a first mounting spindle for one of the gears to be tested journalled on said bed, a work piece carrier movably mounted on said bed, a second mounting spindle for the other one of the gears to be tested journalled on said work piece carrier, means for adjusting and securing the position of said work piece carrier on said bed, a base disc of constant diameter independent of the dimensions of the gear to be tested mounted on each of said mounting spindles, a measuring slide slidably mounted on said bed, means for adjusting and fixing said measuring slide on said bed, a first ruler slidably mounted on said bed in slip-free rolling contact with said base disc on said first mounting spindle, a second ruler mounted on said measuring slide slidable parallel to the guides of said measuring slide in slip-free rolling contact with said base disc on said second mounting spindle, an angularly adjustable control ruler mounted and fixable on said measuring slide having a longitudinal groove, and a slider block pivotally mounted on said first ruler slidably engaged in said longitudinal groove, the angle of adjustment of said control ruler being a function of the ratio of teeth of the two gears to be tested and of the inverse ratio of the diameters of said two base discs.

2. A rolling gear tester as claimed in claim 1 wherein said slip-free rolling contact is secured by magnetic means associated with said base discs and rulers, thereby ensuring their slip-free mutual rolling contact by pressing the same against one another by magnetic attraction.

3. A rolling gear tester as claimed in claim 1 wherein said slip-free rolling contact is secured by means associated with said base discs and rulers, thereby ensuring their slip-free mutual rolling contact by pressing the same against one another.

4. A rolling gear tester as claimed in claim 1, wherein said first and second ruler are mounted for movements perpendicular to one another.

5. A rolling gear tester as claimed in claim 1, wherein said work piece carrier is slidable on said bed in a direction parallel to that of said measuring slide.

6. A rolling gear tester as claimed in claim 1, wherein said control ruler is adjustable to a positive angle relative to the direction of movement of said measuring slide for the testing of a pair of intermeshing externally toothed gears, and to a negative angle for the testing of an internally toothed gear meshing with an externally toothed gear.

7. A rolling gear tester as claimed in claim 1 wherein a recording instrument is mounted on said measuring slide and a recording drum is journalled on said measuring slide in driving connection with said bed so as to be rotated in synchronism with the movement of said measuring slide relative to said bed.

8. A rolling gear tester as set forth in claim 1 wherein a recording stylus is pivoted on said measuring slide and is connected to said second ruler, a recording drum upon which said stylus scribes, said stylus recording on said drum any longitudinal movements of said second ruler relative to said measuring slide.

9. A rolling gear tester as claimed in claim 1 wherein resilient means are provided coupling said second ruler longitudinally to said measuring slide, and adjustment means are provided for said resilient means on said measuring slide reversing the resilient bias of said resilient coupling means for changing the testing of one set of flanks of the intermeshing gear teeth to be tested to the other set of flanks thereof.

10. A rolling gear tester for testing a pair of intermeshing gears comprising in combination a bed, a first mounting spindle for one of the gears to be tested journalled on said bed, a work piece carrier pivotally mounted on said bed about an axis intersecting the axis of said first mounting spindle, a second mounting spindle for the other one of the gears to be tested journalled on said work piece carrier about an axis intersecting the axis of the latter, means for angularly adjusting and securing the position of said work piece carrier on said bed, a base disc of a constant diameter independent of the dimensions of the gear to be tested mounted on said first mounting spindle, a measuring slide slidably mounted on said bed, means for adjusting said measuring slide on said bed, a first ruler mounted slidably on said bed transversely to the movement of said measuring slide in slip-free rolling contact with said first base disc, a second base disc rotatably mounted on said work piece carrier coaxially thereto, a second ruler mounted slidably on said measuring slide in slip-free rolling contact with said second base disc, an angularly adjustable control ruler mounted on said measuring slide having a longitudinal groove, a slider block pivotally mounted on said first ruler slidably engaged in said longitudinal groove, the angle of adjustment of said control ruler being a function of the ratio of teeth of the two intermeshing gears to be tested, of the inverse ratio of the diameters of said two base discs, and of the cone angle of said gears to be tested, and a bevel gearing of constant transmission ratio having one bevel gear connected for rotation with said second base disc and another bevel gear connected for rotation with said second mounting spindle transmitting rotational movement from said second base disc to said second mounting spindle.

11. A rolling gear tester as claimed in claim 10, wherein said bevel gearing transmitting rotational movement from said second base disc to said second mounting spindle is a friction gearing.

12. A rolling gear tester as claimed in claim 10, wherein adjustment means are provided for the off-set between the axes of two intermeshing hypoid gears to be tested, said adjustment means adjusting said work piece carrier, said second mounting spindle journalled on said carrier and said bevel gearing of constant transmission ratio in the direction of the pivot axis of said work piece carrier.

References Cited in the file of this patent

UNITED STATES PATENTS

| | | |
|---|---|---|
| 1,444,470 | Laessker | Feb. 6, 1923 |
| 2,539,239 | Ernst | Jan. 23, 1951 |
| 2,770,048 | Ernst | Nov. 13, 1956 |
| 2,796,672 | Oesterheld | June 25, 1957 |
| 2,881,530 | Maller | Apr. 14, 1959 |
| 2,895,227 | Wagner | July 21, 1959 |

FOREIGN PATENTS

| | | |
|---|---|---|
| 444,209 | England | Mar. 17, 1936 |